US009202131B2

(12) United States Patent
Naito et al.

(10) Patent No.: US 9,202,131 B2
(45) Date of Patent: Dec. 1, 2015

(54) INFORMATION PROCESSING APPARATUS, INFORMATION PROCESSING METHOD, COMPUTER PROGRAM, AND IMAGE DISPLAY APPARATUS

(71) Applicant: SONY CORPORATION, Tokyo (JP)

(72) Inventors: Yorimitsu Naito, Saitama (JP); Susumu Nagano, Tokyo (JP); Kazuhiro Nakagomi, Tokyo (JP); Takayuki Ochi, Kanagawa (JP); Takamasa Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 13/848,283

(22) Filed: Mar. 21, 2013

(65) Prior Publication Data

US 2013/0308864 A1 Nov. 21, 2013

(30) Foreign Application Priority Data

May 15, 2012 (JP) ................................ 2012-111379

(51) Int. Cl.
  *G06K 9/46* (2006.01)
  *G06K 9/00* (2006.01)
  *G06F 17/30* (2006.01)
(52) U.S. Cl.
  CPC ............ *G06K 9/46* (2013.01); *G06F 17/30247* (2013.01); *G06K 9/00677* (2013.01); *G06K 9/00751* (2013.01)

(58) Field of Classification Search
  None
  See application file for complete search history.

(56) References Cited

U.S. PATENT DOCUMENTS

| 2011/0188713 A1* | 8/2011 | Chin et al. ................... 382/118 |
| 2011/0295864 A1* | 12/2011 | Betz et al. ..................... 707/754 |
| 2012/0265758 A1* | 10/2012 | Han et al. ..................... 707/737 |

FOREIGN PATENT DOCUMENTS

| JP | 2005-107885 | 4/2005 |
| JP | 2011-087105 | 4/2011 |

* cited by examiner

*Primary Examiner* — Bhavesh Mehta
*Assistant Examiner* — David F Dunphy
(74) *Attorney, Agent, or Firm* — Paratus Law Group, PLLC

(57) ABSTRACT

There is provided an information processing apparatus including an image analysis unit to analyze image data, and a protagonist identification unit to identify a protagonist of an event including at least one set of image data. The protagonist identification unit identifies the protagonist of the event by using at least a parameter independent of an analysis of an image provided to the event. If the protagonist of the event is not able to be identified by using the parameter independent of the analysis of the image, the information processing apparatus makes the image analysis unit analyze the image data included in the event to identify the protagonist of the event.

18 Claims, 10 Drawing Sheets

FIG. 4

| ITEM | NOTE |
|---|---|
| FACE PICTURE | POSSIBLE TO HOLD MULTIPLE PICTURES |
| LAST NAME | INCLUDE FURIGANA |
| FIRST NAME | INCLUDE FURIGANA |
| NICKNAME | INCLUDE FURIGANA |
| RELATION TO USER | FAMILY (PARENT, CHILD, SPOUSE, SIBLING, GRANDPARENT, GRANDCHILD), FRIEND, ETC. |
| USER'S GROUP NAME | USE "GROUP NAME" IN ADDRESS BOOK, OR SOCIAL NETWORK SERVICES, ETC. |
| DATE OF BIRTH | |
| SEX | |
| ADDRESS | |
| ADDRESS OF FAMILY | |

FIG. 5

| ITEM | NOTE |
|---|---|
| ALBUM TITLE | TEXT INFORMATION ENTERED BY USER |
| STILL IMAGE IN ALBUM | INCLUDE EXIF INFORMATION, GEO INFORMATION OF STILL IMAGE |
| NAME OF STILL IMAGE IN ALBUM | TEXT INFORMATION OR FILE NAME OF STILL IMAGE ENTERED BY USER |
| VIDEO IN ALBUM | |
| NAME OF VIDEO IN ALBUM | |
| TAG | TAG GIVEN BY USER TO STILL IMAGE, VIDEO OR ALBUM (TEXT INFORMATION) |
| COMMENT | COMMENT GIVEN BY USER TO STILL IMAGE, VIDEO OR ALBUM (TEXT INFORMATION) |
| LOCATION | LOCATION INFORMATION GIVEN BY USER TO STILL IMAGE, VIDEO OR ALBUM (TEXT INFORMATION, OR LATITUDE AND LONGITUDE DATA) |
| DATE AND TIME (START DAY AND COMPLETION DAY) | DATE AND TIME OF SHOOTING STILL IMAGES AND VIDEOS OF ALBUM |

FIG. 9
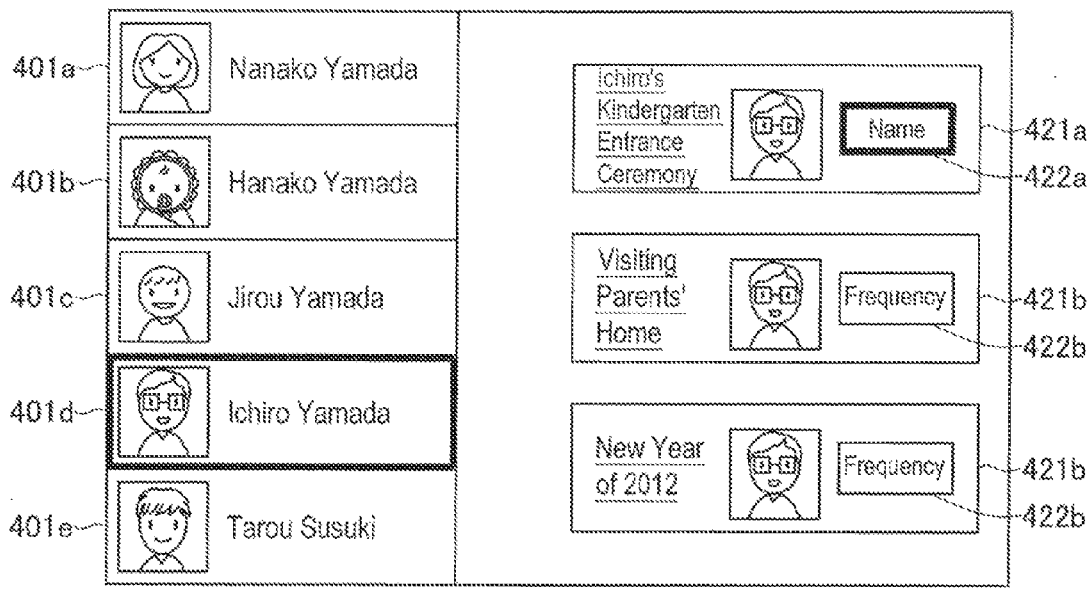
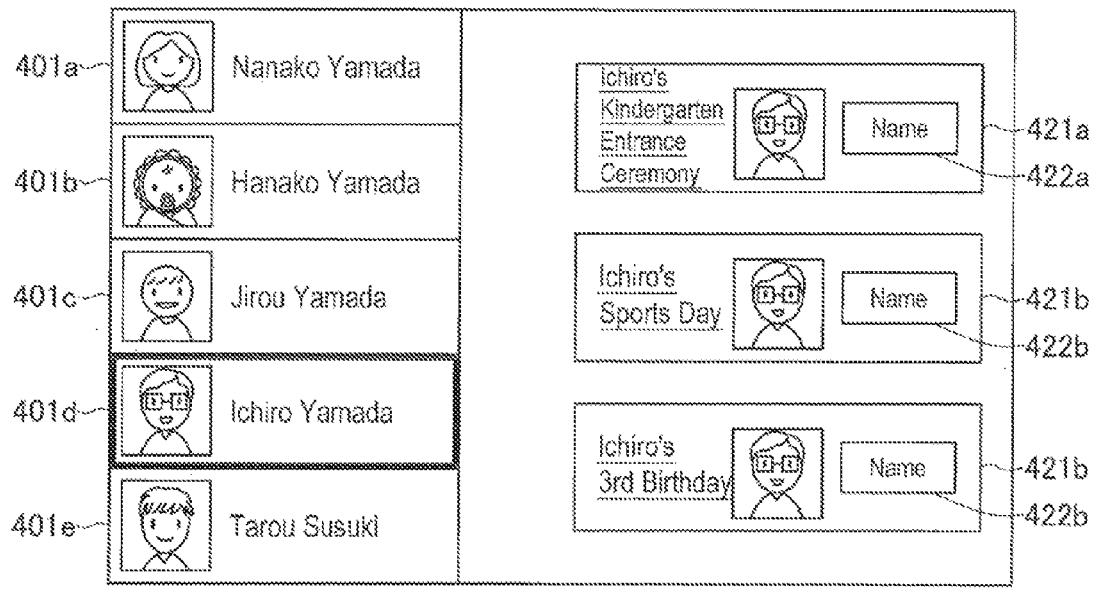

FIG. 12
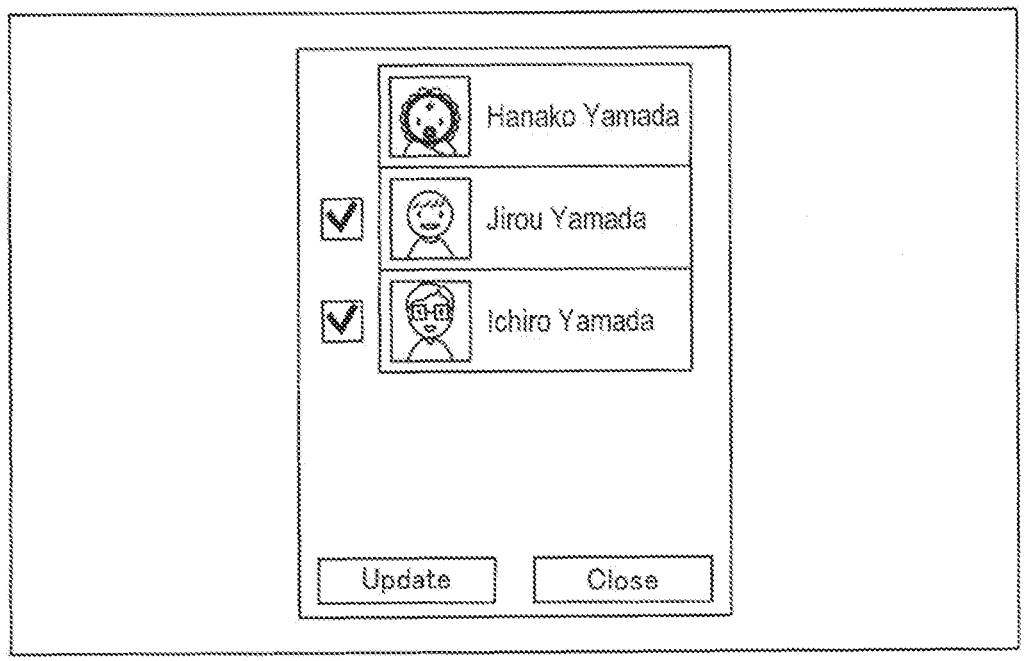
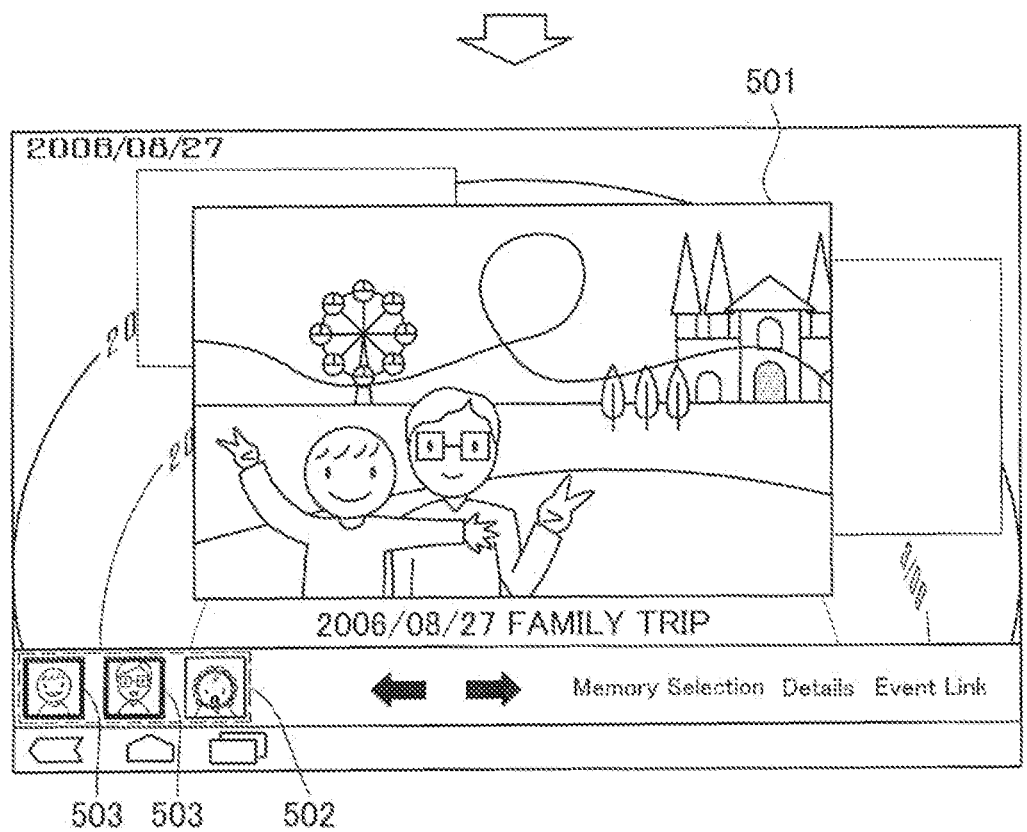

INFORMATION PROCESSING APPARATUS, INFORMATION PROCESSING METHOD, COMPUTER PROGRAM, AND IMAGE DISPLAY APPARATUS

BACKGROUND

The present disclosure relates to an information processing apparatus, an information processing method, a computer program, and an image display apparatus.

There is an image management tool for managing still pictures and videos taken with a digital still camera or a digital video camera. As the capacity of a recording medium has become greater, digital still cameras and digital video cameras are capable of capturing a larger quantity of images. Accordingly, it has become significantly important to improve the usability of the image management tool in order to enhance the convenience of the user.

In particular, there are high needs of the user for managing pictures and videos for each occasion meaningful to the user (hereinafter, referred to as "event"), such as a travel, sports day, matriculation ceremony, birthday party, etc. Therefore, to facilitate the management of the pictures and videos of the individual events will lead to the improvement of the usability of the image management tool.

There is an image management tool which uses a facial recognition feature to determine those who were taken in the pictures and videos for each individual event, and presents a list of their faces. In this regard, JP 2011-87105A and JP 2005-107885A disclose technologies, in which a facial image of a person presumed to be a representative person is extracted from an image, or images are automatically classified based on a characteristic portion of the images.

SUMMARY

The aforementioned technologies can present a list of pictures including the same face or can search for events including the face, but is not capable of automatically determining and presenting a person who becomes the most important participant of the event (hereinafter, referred to as "protagonist"). Furthermore, although there is also a method to manage key event participants by manually adding a tag to the event or pictures, since when multiple tags are added, it is often difficult to determine the priority among the tags, the tags alone are not an effective way of identifying who a person is corresponding to the protagonist of the event.

Accordingly, the present disclosure provides a new, improved information processing apparatus, information processing method, computer program, and image display device, to effectively identify a person who becomes the protagonist of each individual event.

According to an embodiment of the present disclosure, there is provided an information processing apparatus including an image analysis unit to analyze image data, and a protagonist identification unit to identify a protagonist of an event including at least one set of image data. The protagonist identification unit identifies the protagonist of the event by using at least a parameter independent of an analysis of an image provided to the event. If the protagonist of the event is not able to be identified by using the parameter independent of the analysis of the image, the information processing apparatus makes the image analysis unit analyze the image data included in the event to identify the protagonist of the event.

Further, according to an embodiment of the present disclosure, there is provided an information processing method including analyzing image data, and identifying a protagonist of an event including at least one set of image data. The protagonist identification step identifies the protagonist of the event by using at least a parameter independent of an analysis of an image provided to the event. If the protagonist of the event is not able to be identified by using the parameter independent of the analysis of the image, the information processing method has, in the image analysis step, the image data included in the event analyzed to identify the protagonist of the event.

Further, according to an embodiment of the present disclosure, there is provided a computer program for causing a computer to execute analyzing image data, and identifying a protagonist of an event including at least one set of image data. The protagonist identification step identifies the protagonist of the event by using at least a parameter independent of an analysis of an image provided to the event. If the protagonist of the event is not able to be identified by using the parameter independent of the analysis of the image, the information processing method has, in the image analysis step, the image data included in the event analyzed to identify the protagonist of the event.

Further, according to an embodiment of the present disclosure, there is provided an image display apparatus including a content display unit to display a protagonist of an event including at least one set of image data, the protagonist being identified by using at least a parameter independent of an analysis of an image provided to the event. If the protagonist of the event is not able to be identified by using the parameter independent of the analysis of the image, the content display unit displays the protagonist of the event identified by analyzing the image data included in the event.

According the embodiments of the present disclosure described above, it is possible to provide a new, improved information processing apparatus, information processing method, computer program, and image display device, which can effectively identify a person who becomes the protagonist of each individual event.

BRIEF DESCRIPTION OF THE DRAWINGS

FIG. 4 is a diagram illustrating an example of personal information acquired by a personal information acquisition unit 104 and stored in a personal information storage unit 106;

FIG. 5 is a diagram illustrating an example of the information contained in album data acquired by an album data acquisition unit 108;

FIG. 9 is a diagram illustrating an example of the user interface of an image management tool;

FIG. 12 is a diagram illustrating an example of the user interface of an image management tool.

DETAILED DESCRIPTION OF THE EMBODIMENT(S)

Figure 1:
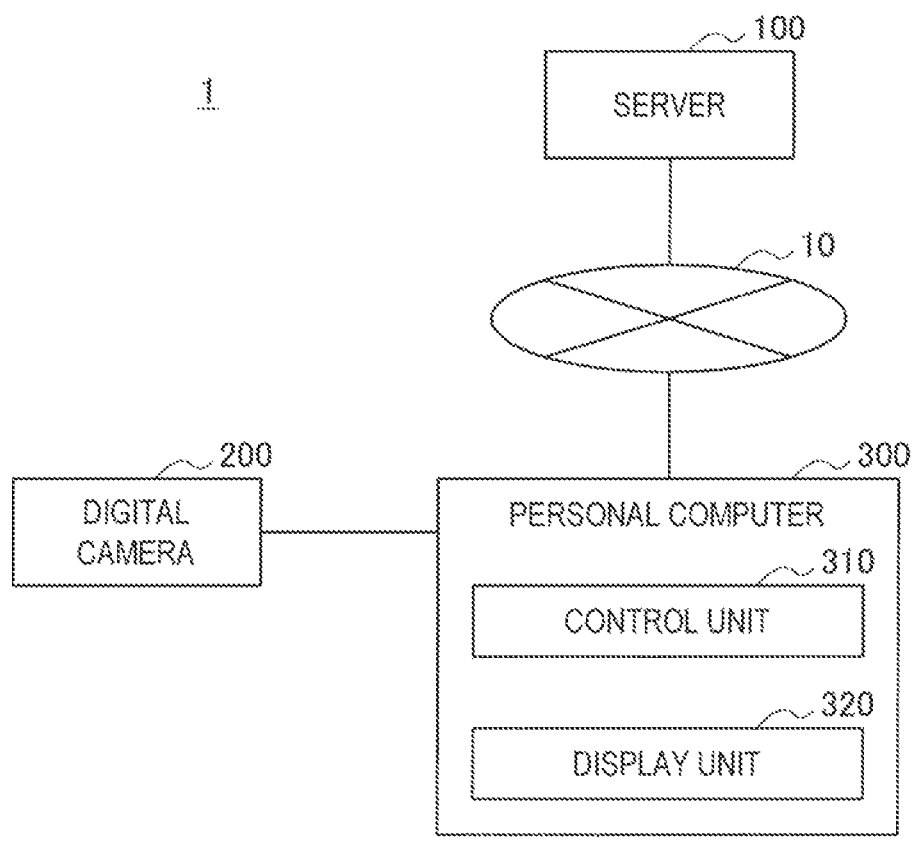
FIG. 1 is a diagram illustrating an example of the configuration of an image processing system 1 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description shall be made in the following order.
<1. Embodiments Of The Present Disclosure>
[Examples Of The Configuration Of The System]
[Examples Of The Configuration Of The Server]
[Examples Of The Operation Of The Server]
[Examples Of The User Interface]
<2. Summary>
<1. Embodiments Of The Present Disclosure>
[Examples Of The Configuration Of The System]

An example of the configuration of the system according to an embodiment of the present disclosure will be first described. FIG. 1 is a diagram illustrating an example of the configuration of an image processing system 1 according to an embodiment of the present disclosure. Hereinafter, with reference to FIG. 1, an example of the configuration of the image processing system according to an embodiment of the present disclosure will be described.

As shown in FIG. 1, the image processing system 1 according to an embodiment of the present disclosure includes a server 100, a digital camera 200 and a personal computer 300. As shown in FIG. 1, the server 100 and personal computer 300 are configured to communicate with each other via a network 10.

The server 100 is configured to perform image processing of image data that have been captured by the digital camera 200 and stored in the personal computer 300. With regard to the image data, the server 100 executes a processing to determine the protagonist of each individual event. An example of the configuration of the server 100 will be described later.

The digital camera 200 captures still pictures or videos (hereinafter, also simply and collectively referred to "images") and creates image data. The image data created by the digital camera 200 are stored in the personal computer 300, to which the digital camera 200 is connected, either automatically or in response to the operation by the user. In the present disclosure, it should be noted that the apparatus for capturing the images and creating the image data may be, but not limited to, a cellular phone, smart phone, tablet PC, personal computer, etc, equipped with an imaging device.

The personal computer 300 operates various kinds of information processing. In the present embodiment, the personal computer 300 stores the image data created by the digital camera 200, and displays the stored image data on a screen by running, for example, an image management tool, or any other application. The personal computer 300 includes a control unit 310, and a display unit 320. The control unit 310 is adapted to control the operation of the personal computer 300, and runs, for example, the aforementioned image management tool or any other applications. The display unit 320 is adapted to display images, text, and any other information, and its operation is controlled by the control unit 310. Although in the present embodiment, the personal computer 300 runs the aforementioned image management tool or the like, it should be noted that the present disclosure is not limited thereto. Mobile phones, smart phones, tablet PCs or any other information processing devices may run the image management tool and any other application, as described above.

In the present embodiment, the personal computer 300 transmits the stored image data to the server 100, and at the same time, requests the server 100 to perform the processing to find the protagonist of each individual event. The personal computer 300 also displays the protagonist of each individual event that has been obtained by the server 100, along with information about the event. In the present embodiment, the personal computer 300 displays the protagonist of each individual event obtained by the server 100, along with the information of the event, but it should be noted that the apparatus to display the protagonist of each individual event obtained by the server 100 is not limited thereto. Furthermore, the displaying of the protagonist of each individual event obtained by the server 100 is not limited to the aforementioned image management tool, and it may be performed by, for example, a general purpose application, such as a web browser.

In the present embodiment, the image data generated by the digital camera 200 is first stored in the personal computer 300, but the present disclosure is not limited thereto. For example, the image data generated by the digital camera 200 may be transmitted directly to the server 100 via the network 10. In the present embodiment, the server 100 performs the processing to determine the protagonist of each individual event, but the present disclosure is not limited thereto. For example, the processing to determine the protagonist of each individual event may be performed by the digital camera 200 or personal computer 300.

The example of the configuration of the image processing system according to an embodiment of the present disclosure has been described so far, with reference to FIG. 1. Next, an example of the functional configuration of the server 100 of the image processing system 1 according to an embodiment of the present disclosure will be described.

[Examples Of The Configuration Of The Server]

Figure 2:
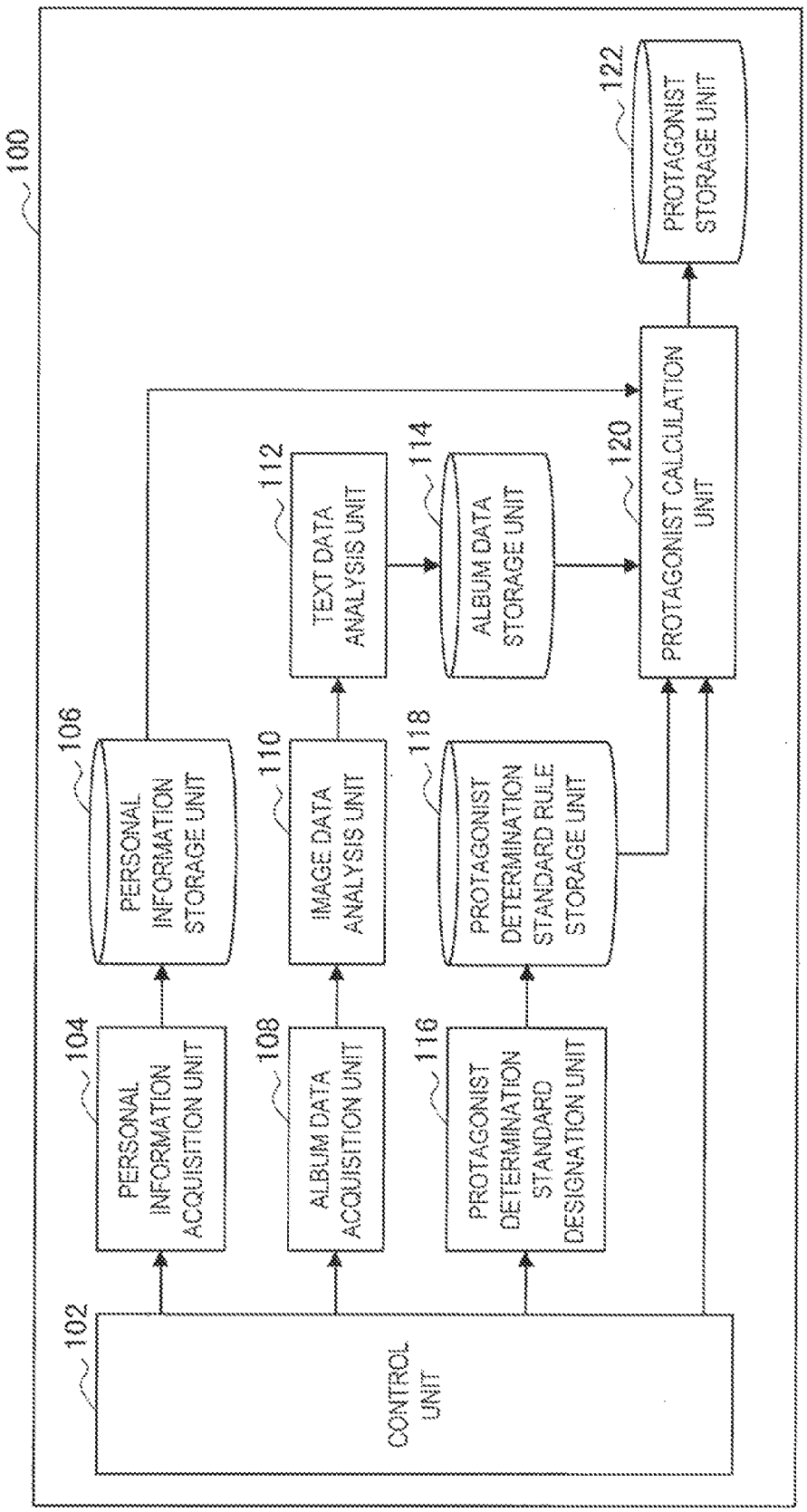
FIG. 2 is a diagram illustrating an example of the functional configuration of the server 100 of the image processing system 1 according to an embodiment of the present disclosure.

FIG. 2 is a diagram illustrating an example of the functional configuration of the server 100 of an image processing system 1 according to an embodiment of the present disclosure. With reference to FIG. 2, the example of the functional configuration of the server 100 will be described below.

As shown in FIG. 2, the server 100 according to an embodiment of the present disclosure includes a control unit 102, and a personal information acquisition unit 104, and a personal information storage unit 106, and an album data acquisition unit 108, an image data analysis unit 110, a text data analysis unit 112, an album data storage unit 114, a protagonist determination standard designation unit 116, a protagonist determination standard rule storage unit 118, a protagonist calculation unit 120, and a protagonist storage unit 122.

The control unit 102 controls the operation of each part of the server 100, as shown in FIG. 2. In particular, the control unit 102 controls the operation of the personal information acquisition unit 104, album data acquisition unit 108, protagonist determination standard designation unit 116, and protagonist calculation unit 120. Also, the control unit 120 controls the displaying of presenting the information of the key event participants of each individual event acquired by the protagonist calculation unit 120, for example, to the personal computer 300.

The personal information acquisition unit 104 obtains personal information used for the protagonist calculation unit 120 to determine a protagonist. For example, the personal information acquisition unit 104 obtains the personal information from an address book software used in the personal computer 300, personal information held in the image management tool run on the personal computer 300, and the friend list of a social networking service (SNS), etc., which is being used by the user. In addition, the personal information, as referred to herein, contains information necessary to identify an individual person, such as a personal name, and may additionally contain the picture of the person's face. The personal information acquisition unit 104 stores the obtained personal information in the personal information storage unit 106. It goes without saying that the timing for the personal information acquisition unit 104 to obtain the personal information is not limited to a certain particular time. The personal information acquisition unit 104 can obtain the personal information at any time prior to the processing to determine the protagonist, which will be described below.

The personal information storage unit 106 stores the personal information acquired by the personal information acquisition unit 104. The personal information stored in the personal information storage unit 106 is used for the processing to determine a protagonist by the protagonist calculation unit 120. In addition, since human faces change with age, in case the only stored picture of a face is one taken at a certain point of time, it will be difficult to properly determine the key event participants by the protagonist calculation unit 120, which will be later described. Therefore, it is desirable that the face pictures stored in the personal information storage unit 106 include not only one taken at a certain point of time but also ones taken earlier in the past.

The album data acquisition unit 108 acquires image data for each individual album. The album data acquisition unit 108 acquires the image data for each individual album, for example, from an image management tool run on the personal computer 300, picture services on the Internet, album features of social networking services, etc. In addition, the album data acquisition unit 108 not only acquires the image data, but it also acquires information entered by the user, for example, the titles of the album, the people appearing in the album, the location and time of shooting the images of the album, etc. The album data acquisition unit 108 transmits the acquired album data to the image date analysis unit 110 and text data analysis unit 112.

The image data analysis unit 110 performs the processing to analyze the image data acquired by the album data acquisition unit 108. The image data analysis unit 110 performs the process to acquire the face information of the image data by the processing to analyze the image data. The image data analysis unit 110 performs the analysis processing of grouping the image data acquired by the album data acquisition unit 108 by time and place of shooting the images of the album, and face. The image data analysis unit 110 transmits the results of the analysis processing for the image data to the album data storage unit 114.

The text data analysis unit 112 performs the processing to analyze the information entered by the user and other text data that the album data acquisition unit 108 has acquired. The text data analysis unit 112 analyzes the information entered by the user and other text data, thereby acquiring information about personal names, place names, time, personal pronouns necessary to identify the people, etc. The text data analysis unit 112 transmits these acquired data to the album data storage unit 114.

The album data storage unit 114 stores the analysis results of the image data by the image data analysis unit 110 and the analysis results of the information entered by the user by the text data analysis unit 112, as album data. The album data stored in the album data storage unit 114 is used for the processing to determine a protagonist by the protagonist calculation unit 120.

The protagonist determination standard designation unit 116 allows the user to designate a determination standard by which the protagonist calculation unit 120 performs the processing to calculate the protagonist. The protagonist determination standard designation unit 116 stores the determination standard appointed by the user in the protagonist determination standard rule storage unit 118. How the user can designate the determination standard for the process of calculating the protagonist will be described later.

The protagonist determination standard rule storage unit 118 stores the determination standard that the user has designated so that the protagonist calculation unit 120 performs the processing to calculate the protagonist. The stored determination standard of the protagonist determination standard rule storage unit 118 is used for the processing to determine the protagonist by the protagonist calculation unit 120. In addition, the determination standard by which the protagonist calculation unit 120 performs the processing to determine the protagonist may include the frequency of appearance of an image in an album, the title of the album, the time of the album, etc.

The protagonist calculation unit 120 performs a calculation to find a key event participant. The protagonist calculation unit 120 is adapted to find the key event participant through a calculation by using the personal information stored in the personal information storage unit 106, the album data stored in the album data storage unit 114, and the determination standard stored in the protagonist determination standard rule storage unit 118. In addition, the protagonist calculation unit 120 may find multiple key event participants. If there are multiple key event participants, the protagonist calculation unit 120 may prioritize those key event participants. When prioritizing the key event participants, the protagonist calculation unit 120 gives a score to each of the key event participants, and the priority of the key event participants can be determined by the scores. After obtaining the key event participants, the protagonist calculation unit 120 stores the result in the protagonist storage unit 122.

The protagonist storage unit 122 stores key event participants that the protagonist calculation unit 120 finds for each individual event. Information about the key event participants stored in the protagonist is called, for example, by the image management tool run on the personal computer 300, and is displayed on the image management tool.

The example of the functional configuration of the server 100 has been described above with reference to FIG. 2. By having the configuration illustrated in FIG. 2, the server 100 according to an embodiment of the present disclosure can effectively identify the key event participants in an album consisting of a plurality of images. Now an example of the operation of the server 100 according to an embodiment of the present disclosure will be described below.

[Examples Of The Operation Of The Server]

Figure 3:
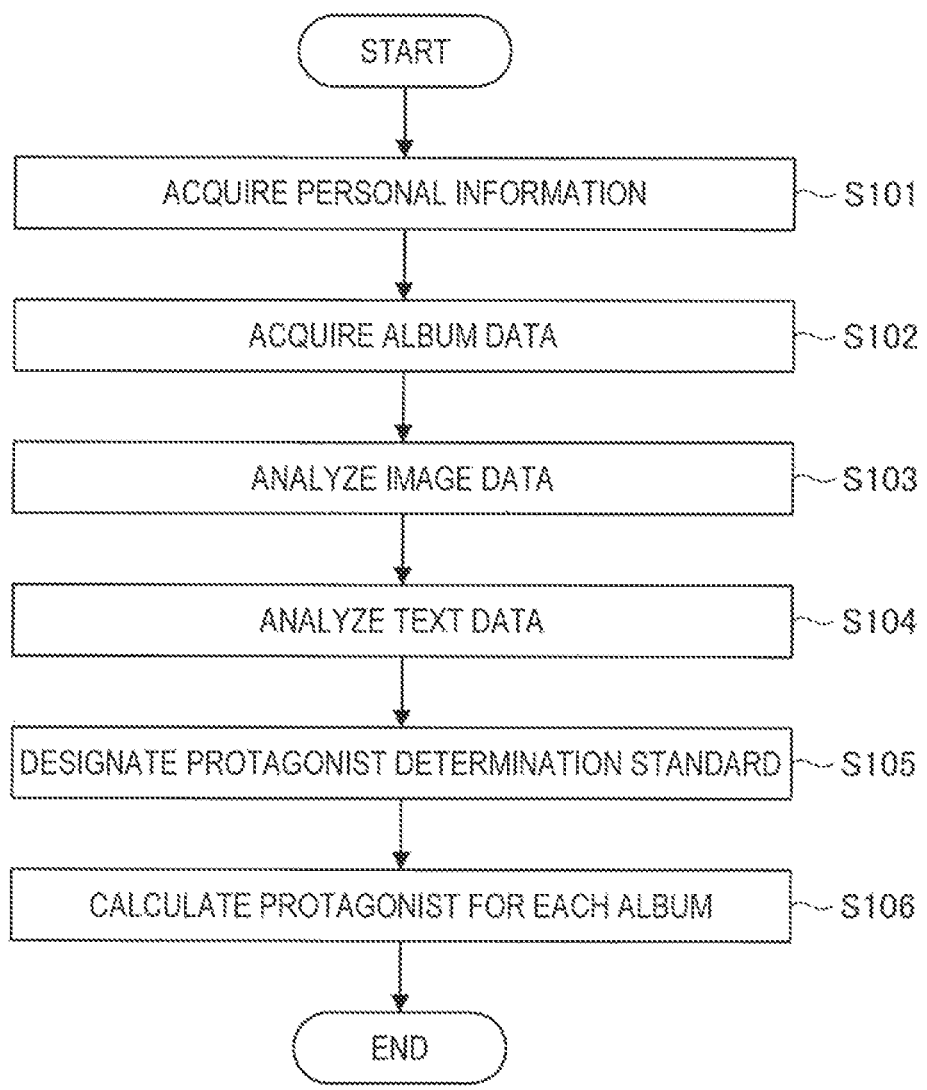
FIG. 3 is a flow chart illustrating an example of the operation of the server 100 according to an embodiment of the present disclosure.

FIG. 3 is a flow chart illustrating an example of the operation of the server 100 according to an embodiment of the present disclosure. The flow chart shown in FIG. 3 concerns the operation when the server 100 performs a calculation to find a person who is the protagonist of an album. With reference to FIG. 3, the example of the operation of the server 100 according to an embodiment of the present disclosure will be described in detail below.

When performing the calculation to find the protagonist of an album, the server 100 acquires personal information from the personal information acquisition unit 104 (step S101). As described above, the personal information acquisition unit 104 acquires the person information, for example, from address book software that the user is using on the personal computer 300 or the like, personal information held by the image management tool run on the personal computer 300, friend lists of social networking services (SNSs), etc.

FIG. 4 is a diagram illustrating an example of the person information which is acquired by the personal information acquisition unit 104 and is stored in the personal information storage unit 106. In FIG. 4, the personal information, as shown, includes a picture (or pictures) of the person's face, the name of the person, the nickname of the person, the relationship between the person and the user himself, the user's group name(s), the date of birth, sex, and the address of the person, and the address of the family, etc. It is possible to hold a plurality of pictures of the person's face, and moreover, the name and nickname may have furigana (a Japanese reading aid). The relationship between the person and the user himself refers to, for example, a family member (parent, child, spouse, sibling, grandparent, or grandchild), a relative, a friend, etc. In addition, group names set in the address book or social networking services can be used for the user's group name(s).

The server 100 then acquires album data from the album data acquisition unit 108 (step S102). In this case, the album data acquisition unit 108 acquires image data, as the album data, with the album as a unit. The album data acquisition unit 108 acquires the image data for each individual album, for example, from the image management tool run on the personal computer 300, picture services on the Internet, album features of social networking services, etc. In addition to the image data, the album data acquisition unit 108 also acquires other information entered by the user, for example, the title of the album, the people appearing in the album, the place and time of shooting the images of the album, etc.

FIG. 5 is a diagram illustrating an example of the information contained in the album data acquired by the album data acquisition unit 108. The information included in the album data, as shown in FIG. 5, includes the title of the album, a still image in the album and its title, a video in the album and its title, a tag, comment, location and date.

The title of the album is, for example, a name designated by the user through the image management tool. The information about the still image of the album includes, for example, the Exif information and Geo information (location information) of the still image. The titles of the still images and videos of the album are names that the user has designated to the still images and videos, for example, by using the image management tool or file names of the still images and videos. The tag information is text information that the user has given to the album, for example, by using the image management tool, such as the personal name or personal pronoun of an event participant, or the type of the event, etc. The comment information is text information that the user has given to the album, for example, by using the image management tool. The location information is location information that the user has given to the album, for example, by using the image management tool, which can be obtained from the text information or the location information of the images. The date information is information about the date and time when the still images and videos in the album were taken, and information about the dates of starting and completion of the album is obtained from the information of the date and time of shooting the still images and videos in the album.

The server 100 then makes the image data analysis unit 110 analyze image data contained in the album data that the album data acquisition unit 108 acquired at the aforementioned step S102 (step S103). As mentioned above, the image data analysis unit 110 performs the processing to analyze the image data acquired by the image data acquisition unit 108, and thereby acquiring face information from the image data. The image data analysis unit 110 performs the analysis processing of grouping the image data acquired by the album data acquisition unit 108, by time and place of shooting the images and by similar faces.

The image data analysis unit 110 collects similar faces, and matches them with the face images contained in the personal information stored in the personal information storage unit 106. In addition, with regard to a video, the image data analysis unit 110 determines a representative scene and extracts a still image from the representative scene, and then executes the above-described processing. The image data analysis unit 110 transmits the result of the analysis processing of the image data to the album data storage unit 114.

Subsequently, the server 100 makes the text data analysis unit 112 analyze text data contained in the album data that the album data acquisition unit 108 acquired at the aforementioned step S102 (step S104). The text data analysis unit 112 analyzes information entered by the user or any other text data to acquire information, such as a personal name, place name, time, and personal pronounce to identify a person, etc. The text data analysis unit 112 transmits the result of the text data analysis processing to the album data storage unit 114.

Subsequently, the server 100 allows the user to make the protagonist determination standard designation unit 116 designate a determination standard by which the protagonist calculation unit 120 calculates a protagonist (step S105). The protagonist determination standard designation unit 116 stores the protagonist determination standard specified by the user in the protagonist determination rule storage unit 118.

Subsequently, by using the personal information stored in the personal information storage unit 106, the album data stored in the album data storage unit 114, and determination standards stored in the protagonist determination rule storage unit 118, the server 100 makes the protagonist calculation unit 120 perform a calculation to find the key event participants of an event corresponding to the album (step S106). An example of the calculation processing of the protagonist calculation unit 120 to find the key event participants will be discussed in detail later.

By performing a series of operations shown in FIG. 3, the server 100 can calculate a person who is the protagonist of an album.

The example of the operation of the server 100 according to an embodiment of the present disclosure has been described so far, with reference to FIG. 3. Now an example of calculating the key event participants by the protagonist calculation unit 120 at the above step S106 will be described in detail.

Figure 6:
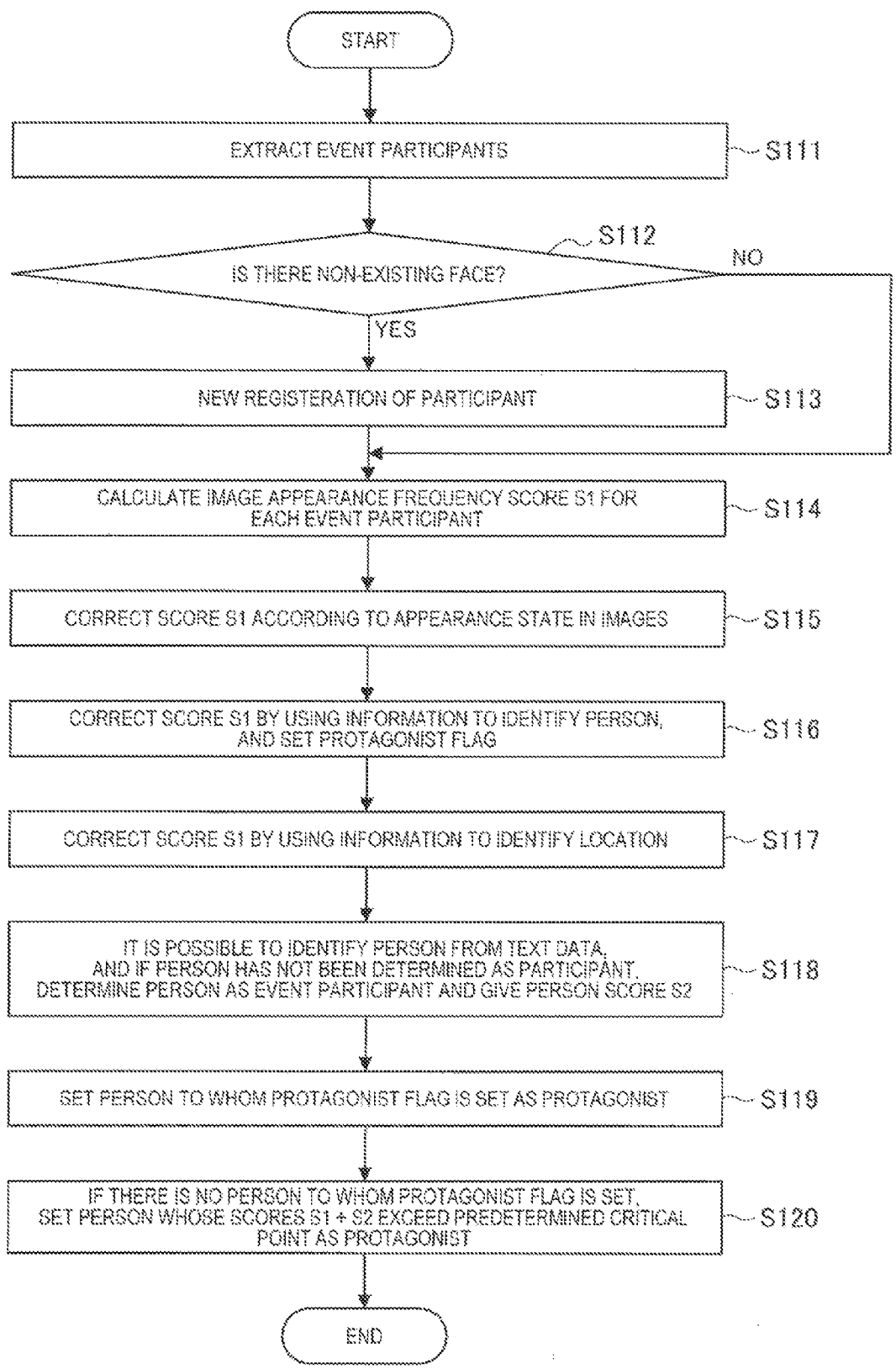
FIG. 6 is a flow chart illustrating an example of the operation of the server 100 according to an embodiment of the present disclosure.

FIG. 6 is a flow chart illustrating an example of the operation of the server 100 according to an embodiment of the present disclosure. The flow chart shown in FIG. 6 illustrates an example of the operation of calculating the key event participants by the protagonist calculation unit 120 at step S106 of FIG. 3. With reference to FIG. 6, examples of the operation of the server 100 according to an embodiment of the present disclosure will be described below.

The protagonist calculation unit 120 treats an album as a single event, and calculates key event participants by event. First, the protagonist calculation unit 120 compares the personal information stored in the personal information storage unit 106 with the face information contained in the album data stored in the album data storage unit 114 to extract the participants of the event (step S111).

The protagonist calculation unit 120 then compares the personal information stored in the personal information storage unit 106 with the face information contained in the album data stored in the album data storage unit 114, and confirms whether there is any face information that does not match the personal information stored in the personal information storage unit 106 (step S112). As a result of the determination processing at step S112, if there is any face information that does not match the personal information stored in the personal information storage unit 106, the protagonist calculation unit 120 registers the new face information in the face information storage unit 106 (step S113). As a result of the determination processing at step S112, if there is no face information that does not match the personal information stored in the personal information storage unit 106, the processing of step S113 is skipped.

It should be noted that even if there is any face information that matches the personal information stored in the personal information storage unit 106, it is possible that the protagonist calculation unit additionally registers the face information in the personal information storage unit 106.

The protagonist calculation unit 120 then calculates a frequency at which each of the participants of the event extracted at the above step S111 appears in the images (hereinafter, referred to as "image appearance frequency score S1") (step S114). In the present example, the protagonist determination standard designation unit 116 designates the appearance frequency as the protagonist determination standard. However, in case another protagonist determination standard is designated by the protagonist determination standard designation unit 116, the score is calculated according to that standard.

Here, an example of calculating the image appearance frequency score S1 by the protagonist calculation unit 120 is described. For example, if there is a person who continually appears from the beginning to the end of the event, the protagonist calculation unit 120 gives that person a high image appearance frequency score S1. In addition, the protagonist calculation unit 120 determines the image appearance frequency score S1 by using not only the subject event, but other events as well. For instance, in case an album includes a number of pictures taken on a sports day for the user's own child, the album will have many pictures that include not only the user's own child, who is the subject of the pictures, but also the child's peers. Therefore, the protagonist calculation unit 120 may calculate the image appearance frequency score S1 of the child by using the album of the sports day of that particular year, and the sports day albums from other years as well.

Then, the protagonist calculation unit 120 corrects the image appearance frequency score S1 of each event participant calculated at the above step S114, according to the state of appearance in images (step S115). For example, if there is a picture in which a certain person's face takes up a relatively large portion of the picture, the protagonist calculation unit 120 can make a correction to raise the image appearance frequency score S1 of that person. Moreover, if there is a picture in which a certain person is taken alone, the protagonist calculation unit 120 may correct the image appearance frequency score Si of that person to give a higher score. The above-described corrections are under the assumption that the protagonist of an event should have a picture in which he or she is taken alone, or a picture with a focus on his or her face.

Subsequently, the protagonist calculation unit 120 corrects the image appearance frequency score Si of each event participant calculated at the above step S114, based on information to identify a person (step S116). For example, if, as a result of analyzing the text data included in an album by the protagonist calculation unit 120, the text data include the personal name of a certain event participant, a correction is made such that the image appearance frequency score S1 of that participant becomes higher. Moreover, in this case, since the chances that that participant is a key event participant of the event are high, the protagonist calculation unit 120 sets a protagonist flag to that person.

Subsequently, the image calculation unit 120 corrects the image appearance frequency score S1 of each event participant, calculated at the above step S114, by using information to identify a place associated with each event participant (step S117). The information to identify the place associated with each of the event participants include information about, for example, a place of residence, parents' home, school, etc. For example, if the result of analyzing the text data included in the album data by the text data analysis unit 112 finds information identifying a place associated with an event participant, the protagonist calculation unit 120 corrects the image appearance frequency score Si of that event participant to give a higher one.

Through the series of processing described so far, the protagonist calculation unit 120 has acquired the image appearance frequency score S1 of each event participant, and also has corrected the image appearance frequency score S1, based on the results of analysis of the image appearance frequency and/or text data of the album.

In some cases, however, the protagonist of an event does not appear in a still image or video. This happens, for example, in a case where the protagonist has shot the still image or video with a digital camera. In order to consider such a case, the protagonist calculation unit 120 can identify a person from text data, which includes information to identify the person, such as a personal name or personal pronoun, and so, if the person has not yet been determined as an event participant, the protagonist calculation unit 120 determines the person as an event participant, and at the same time, gives the person a score S2 (step S118).

So far, the protagonist calculation unit 120 has given two kinds of score S1 and S2 to each event participant, and has set a protagonist flag to a person who is highly likely a key event participant of the event.

Subsequently, the protagonist calculation unit 120 stores the event participant to whom the protagonist flag has been set, in the protagonist storage unit 122 (step S119). If there is no person to whom the protagonist flag is set, the protagonist calculation unit 120 stores a person, the sum of the scores S1 and S2 of whom exceeds a predetermined critical point, in the protagonist storage unit 122 as the key event participant of the event (step S120).

By executing the series of operation shown in FIG. 6, the protagonist calculation unit 120 can extract participants of the event, and determine one of the participants as the key event participant of the event.

The example of the operation of the server 100 according to an embodiment of the present disclosure has been described above with reference to FIG. 6. When calculating the key event participant, the protagonist calculation unit 120 uses a parameter which does not depend on the analysis of the images of the event (e.g., text data), to attempt to calculate the key event participant of the event, and in case it is not possible to calculate the key event participant, only based on the parameter which does not depend on the image analysis, the protagonist calculation unit 120 may calculate the key event participant by using a parameter which depends on the image analysis, as well. For instance, the protagonist calculation unit 120 determines whether the score S2 of a person obtained by the analysis of the text data exceeds a predetermined critical point. If the score S2 exceeds the critical point, that person is determined as a key event participant, and on the other hand, if the score S2 does not exceed the critical point, the determination of the key event participant can be made depending on whether or not the sum of the scores S1 and S2 exceeds the critical point.

When calculating the key event participant of an event, the protagonist calculation unit 120 may use information about that event, as well as other information about other events. For example, in the case of an annual event, such as a birthday or sports day, not only the key event participant of the event but also many other people may appear in the images, but the main protagonist calculation unit 120 is better able to acquire the key event participant of the event by referring to a similar event in the past.

When calculating the key event participant of an event, the protagonist calculation unit 120 uses personal information stored in the personal information storage unit 106, but in this case, the protagonist calculation unit 120 may also calculate the key event participant by using personal relationship at the time of the event. For instance, in the case of an event where a certain person (Mr. A) appears in images, together with another person (Mr. B), if at the time of the event, only Mr. A is stored as a friend in the person information storage unit 106, the protagonist calculation unit 120 may determine that Mr. A is the key event participant of the event.

In addition, when calculating the key event participant of an event, the protagonist calculation unit 120 may calculate the key event participant by using a method of elimination from the information of other albums. For example, in the case where four people are registered as a family, and there exist birthday party events for three of them, the remaining birthday party event is for the last person who remains, hence the protagonist calculation unit 120 can calculate that person as the key event participant of the birthday party.

The server 100 determines the key event participant of an event in this way, and the information about the key event participant can be utilized to display the key event participant of each event on an image management tool run on the personal computer 300, and retrieve the events of the key event participant, etc., for example. Next, an example of the image management tool run on the personal computer 300 will be described.

Figure 7:
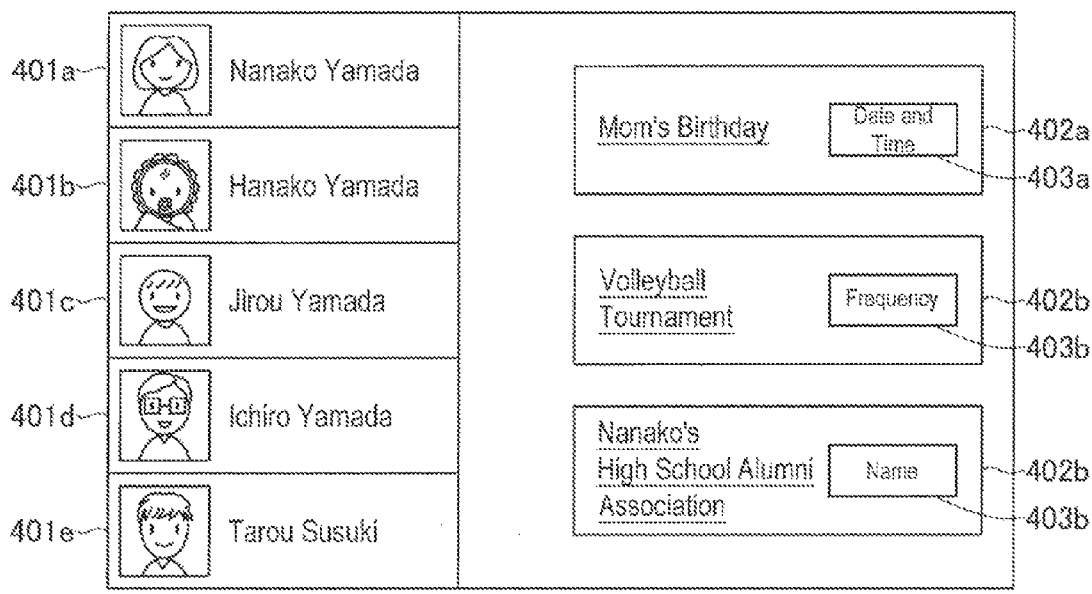
FIG. 7 is a diagram illustrating an example of the user interface of an image management tool.

FIG. 7 is a diagram illustrating an example of the user interface of the image management tool run on the personal computer 300. FIG. 7 shows an example of the user interface of the image management tool on a screen 320 of the personal computer 300. FIG. 7 illustrates a state in which personal information 401a, 401b, 401c, 401d and 401e, registered on the image management tool, is displayed on the left-hand side, and albums 402a, 402b and 402c stored on the personal computer 300 that meet a certain condition, is displayed on the right-hand side, respectively.

There has been a known image management tool which can retrieve an album including a certain person, in response to the selection of the person from those registered therein, but the known image management tool is not capable of retrieving an album including the person as the protagonist therefor.

Meanwhile, according to the embodiment of the present disclosure, since the server 100 finds a protagonist for each album from the image data stored in the personal computer 300, the image management tool run on the personal computer 300 can use information about the key event participant that the server 100 finds to retrieve an album in which the selected person is the protagonist.

In the example shown in FIG. 7, if the user selects, for example, "Nanako Yamada," indicated by reference numeral 401a, among the five people displayed on the screen of the image management tool, the image management tool can display albums 402a, 402b and 402c, for which the selected person is the protagonist, on the right-hand side of the screen.

In addition, as shown in FIG. 7, the reason (reference numerals 403a, 403b and 403c) why the person has been chosen as the key event participant for each of the albums 402a, 402b and 402c are indicated as well. For example, the album 402a, titled "Mom's Birthday," indicates that the reason the person is chosen as the key event participant is the time of the album. Further, the album 402b, titled "Volleyball Tournament," indicates that the reason why the person is chosen as the key event participant is the frequency at which the person appears in the album. Furthermore, the album, titled "High School Alumna Nanako," indicates that the reason why the person is chosen as the key event participant is the title of the album.

Figure 8:
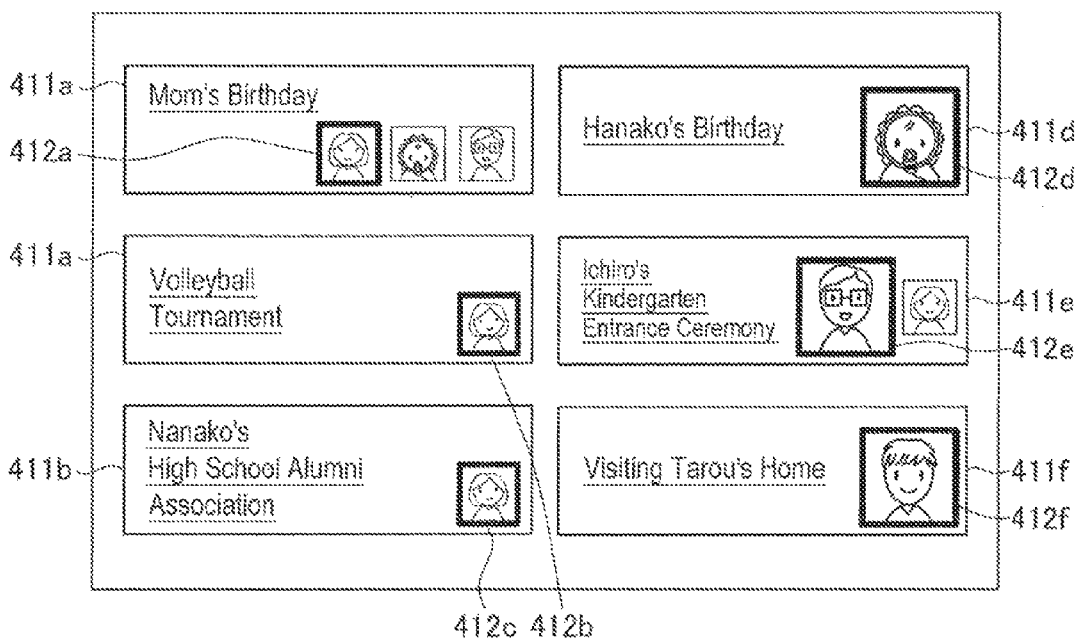
FIG. 8 is a diagram illustrating an example of the user interface of an image management tool.

FIG. 8 is a diagram illustrating an example of the user interface of the image management tool run on the personal computer. FIG. 8 illustrates a state in which albums stored in the personal computer 300 are listed.

In FIG. 8, together with albums 411a-411f, the face pictures of the person(s) appearing in each album are illustrated. Further, the face picture of the key event participant of each of the albums is framed in a bold line 412a-412f. The indication of the bold frame is made based on information about the key event participants that the server 100 has found. In this way, by displaying the participants of an event and key event participant of the event for each album, the image management tool run on the personal computer 300 can present the important persons of each album to the user.

Further, as in the albums of "Hanako's Birthday," "Ichiro's Kindergarten Entrance Ceremony," and "Visiting Tarou's Home," shown in FIG. 8, the image management tool run on the personal computer 300 may display the face picture of the key event participant of each album bigger than the others'.

FIG. 9 is a diagram illustrating an example of the user interface of the image management tool run on the personal computer 300. In FIG. 9, as with FIG. 7, personal information 401a, 401b, 401c, 401d and 401e, registered in the image management tool, is displayed on the left-hand side, and albums 421a, 421b and 421c which satisfy a certain condition stored in the personal computer 300 are displayed on the right-hand side, respectively. Further, the reason (reference numerals 422a, 422b and 422c) the key event participant is chosen is also indicated in each of the albums 421a, 421b and 421c.

In FIG. 9, in case "Ichiro Yamada" is selected, albums for which he is the protagonist can be displayed on the right-hand side. In the case where the user attaches a personal name to the title of an album, setting "name" as a standard for determining a key event participant enables the sever 100 to more effectively determine the key event participant.

It is also possible that the image management tool run on the personal computer 300 is configured to allow the user to select the determination standard of the key event participant. FIG. 9 shows the search results of a case where "name" is the determination standard of the key event participant, when the priority of the determination standard using "name" in the image management tool is raised. Thus, by making the priority of the determination standard of the key event participant adjustable, the server 100 can calculate a key event participant that better matches the user's preference.

Figure 10:
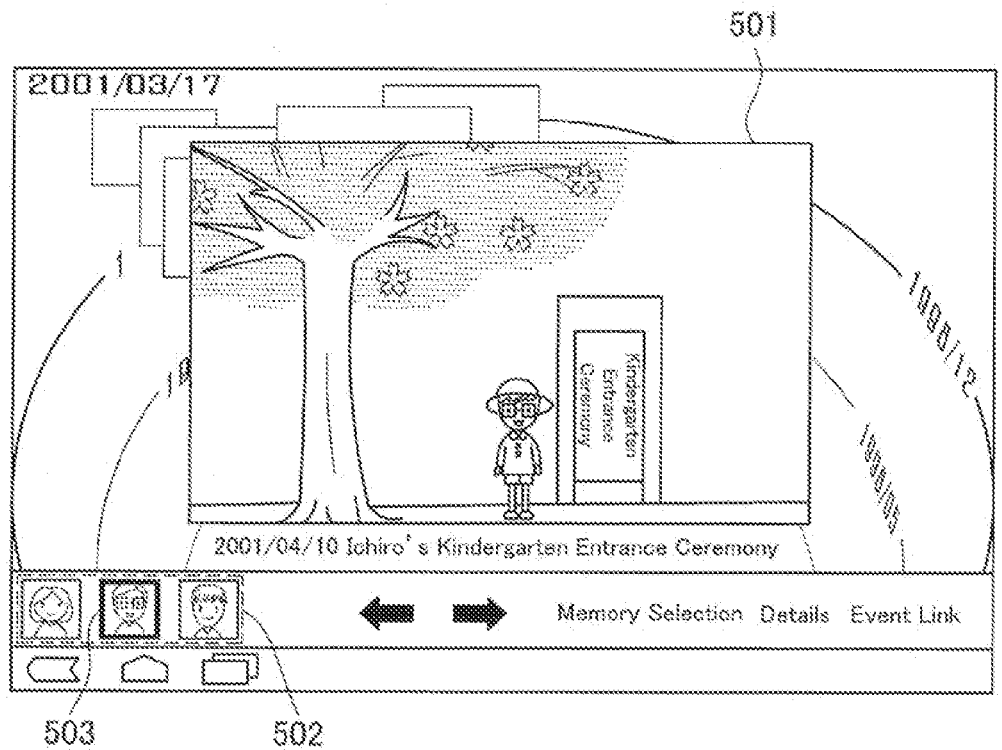
FIG. 10 is a diagram illustrating an example of the user interface of an image management tool.

FIG. 10 is a diagram illustrating an example of the user interface of the image management tool run on the personal computer 300. FIG. 10 illustrates an image 501 included in an album at the center of the screen of the image management tool, and at same time, a list of face pictures 502 of the people appearing in the album on the bottom left-hand corner of the image management tool. In addition, FIG. 10 also illustrates a state in which the face picture of the person selected as the key event participant by the server 100 is highlighted in a bold frame 503.

Figure 11:
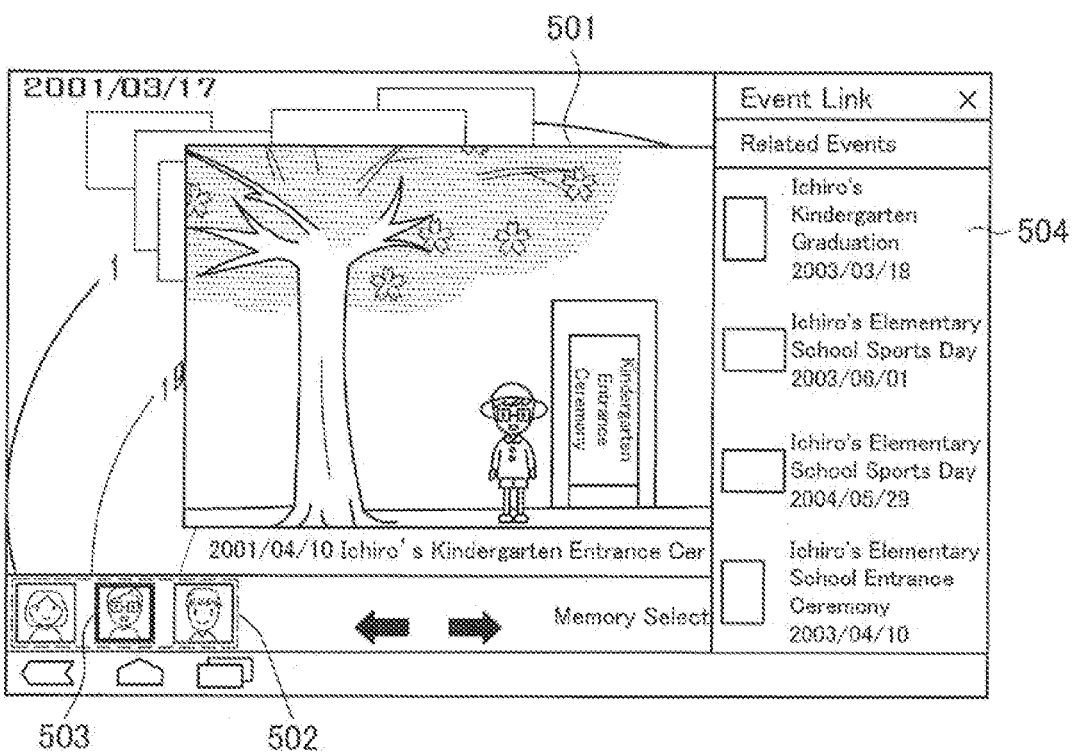
FIG. 11 is a diagram illustrating an example of the user interface of an image management tool.

FIG. 11 is a diagram illustrating an example of the user interface of the image management tool run on the personal computer 300. FIG. 11 illustrates a transition from a state as shown in FIG. 10 to another state when a person who was calculated as the key event participant is selected. If the user selects the key event participant of the album being displayed on the present screen, the image management tool displays a list of albums 504 of the same person on the screen.

In addition, it should be noted that FIG. 11 shows an example in which the albums of a person selected as the key event participant are displayed, but it is also possible that in parallel with the albums of the person selected as the protagonist, the server 100 sorts and displays the participants by their scores given according to a parameter used for the standard to calculate the key event participants of the albums being displayed on the personal computer 300.

As described above, the server 100 is able to calculate the key event participant for each individual event. However, an error may occur in the calculation result, and the calculation result may be different from what is originally intended by the user. In such cases, a feedback can be sent from the image management tool run on the personal computer 300 to the server 100.

FIG. 12 is a diagram illustrating an example of the user interface of an image management tool run on the personal computer 300. FIG. 12 illustrates an example of the feedback regarding the key event participant of an event for the server 100.

If the user corrects the key event participant on a screen for feedback of the key event participant of an event, the image management tool transmits the user's correction to the server 100. Then, the image management tool displays information of the key event participants after the correction is made, on the screen. In this way, the image management tool makes it possible to give feedback with regard to the calculation result of the server 100, thereby presenting a result closer to the user's intention to the user.

In addition, it should be noted that although one example of the user interface of the image management tool run on the personal computer 300 has been described so far, an example of the image management tool run on the personal computer 300 is not limited thereto. Further, it has been described that the image management tool is run on the personal computer 300, but the present disclosure is not limited thereto. For example, the image management tool may be a Web service provided by the server 100. In this case, it is possible that the control unit 102 of the server 100 is adapted to control the displaying of the above-described user interface on a device, such as the personal computer 300.

<2. Summary>

According to an embodiment of the present disclosure, as described above, there is provided a server 100 which analyzes the image data for each individual event, and calculates the key event participant(s) of the event. When calculating the key event participant(s) of the event, the server 100 extracts people appearing in the event, and at the same time, gives a score to each of the extracted people. When giving the score to each of the extracted people, the server 100 uses an appearance frequency, analysis result of the text data of an album, information of event participants in other albums, etc. If the text data of the album contains information that is estimated to be a protagonist, the server 100 sets a protagonist flag to that person.

If the protagonist flag is set to any one of the event participants, the server 100 determines that person as the protagonist, and if there is none to whom the flag is set, the server 100 determines who the protagonist is, based on the scores given to each of the event participants.

By performing such operation, the server 100 finds who is the key event participant(s) for each individual event, and presents who is the key event participant(s) to the user. Based on the information obtained by the server 100, the user can more easily grasp the protagonist of the event.

When the server 100 calculates the key event participant(s) of each individual event, different kinds of user interface, which use the information of the key event participant(s), become available. For example, it becomes possible to retrieve an event with the key event participant(s) as a key. Furthermore, it is possible to realize a user interface for correcting the key event participant(s) calculated by the server 100.

With reference to the accompanying drawings, embodiments according to the embodiment of the present disclosure have been described in detail, but note that the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
  an image analysis unit to analyze image data; and
  a protagonist identification unit to identify a protagonist of an event including at least one set of image data,
  wherein the protagonist identification unit identifies the protagonist of the event by using at least a parameter independent of an analysis of an image provided to the event, and
  wherein, if the protagonist of the event is not able to be identified by using the parameter independent of the analysis of the image, the information processing apparatus makes the image analysis unit analyze the image data included in the event to identify the protagonist of the event.
(2) The image processing apparatus according to (1), wherein the protagonist identification unit identifies the protagonist of the event by using other information of the event.
(3) The image processing apparatus according to (1) or (2), further including:
  a protagonist determination standard designation unit to designate a standard for the protagonist identification unit to identify the protagonist.
(4) The image processing apparatus according to any one of (1) to (3), further including:
  a display control unit to present, for each event, the protagonist identified by the protagonist identification unit.
(5) The image processing apparatus according to (4), wherein the display control unit presents a standard to identify the protagonist identified by the protagonist identification unit.
(6) The image processing apparatus according to any one of (1) to (5), wherein the protagonist identification unit identifies the protagonist of the event by using text data provided to the event, as the parameter independent of the analysis of the image.
7) The image processing apparatus according to (6), wherein the protagonist identification unit identifies the protagonist of the event by using information to identify a person, included in the text data provided to the event.

(8) The image processing apparatus according to (7), wherein, if the information to identify a person is included in the text data, the protagonist identification unit identifies the person as the protagonist of the event.

(9) The image processing apparatus according to (6), wherein the protagonist identification unit identifies the protagonist of the event by using a personal pronoun, included in the text data provided to the event.

(10) The image processing apparatus according to any one of (1) to (9), wherein the protagonist identification unit provide a score to a participant of the event based on a result of the analysis of the image performed by the image analysis unit, and identifies the protagonist of the event, based on the score.

(11) An information processing method including:
analyzing image data; and
identifying a protagonist of an event including at least one set of image data,
wherein the protagonist identification step identifies the protagonist of the event by using at least a parameter independent of an analysis of an image provided to the event, and
wherein, if the protagonist of the event is not able to be identified by using the parameter independent of the analysis of the image, the information processing method has, in the image analysis step, the image data included in the event analyzed to identify the protagonist of the event.

(12) A computer program for causing a computer to execute:
analyzing image data; and
identifying a protagonist of an event including at least one set of image data,
wherein the protagonist identification step identifies the protagonist of the event by using at least a parameter independent of an analysis of an image provided to the event, and
wherein, if the protagonist of the event is not able to be identified by using the parameter independent of the analysis of the image, the information processing method has, in the image analysis step, the image data included in the event analyzed to identify the protagonist of the event.

(13) An image display apparatus including:
a content display unit to display a protagonist of an event including at least one set of image data, the protagonist being identified by using at least a parameter independent of an analysis of an image provided to the event,
wherein, if the protagonist of the event is not able to be identified by using the parameter independent of the analysis of the image, the content display unit displays the protagonist of the event identified by analyzing the image data included in the event.

The present disclosure contains subject matter related to that disclosed in Japanese Priority Patent Application JP 2012-111379 filed in the Japan Patent Office on May 15, 2012, the entire content of which is hereby incorporated by reference.

What is claimed is:

1. An information processing apparatus comprising:
an image analysis unit configured to analyze image data using circuitry; and
a protagonist identification unit configured to identify a protagonist of an event including at least one set of image data using circuitry,
wherein the protagonist is the most important person of the event,
wherein the protagonist identification unit identifies the protagonist of the event by using at least a parameter independent of an analysis of an image provided to the event,
wherein, if the protagonist of the event is not able to be identified by using the parameter independent of the analysis of the image, the information processing apparatus makes the image analysis unit analyze the image data included in the event to identify the protagonist of the event, and
wherein the protagonist identification unit provides a score to a participant of the event based on a result of the analysis of the image performed by the image analysis unit, and identifies the protagonist of the event, based on the score.

2. The image processing apparatus according to claim 1, wherein the protagonist identification unit identifies the protagonist of the event by using other information of the event.

3. The image processing apparatus according to claim 1, further comprising:
a protagonist determination standard designation unit configured to designate a standard for the protagonist identification unit to identify the protagonist using circuitry.

4. The image processing apparatus according to claim 3, wherein the standard for the protagonist identification unit comprises one or more selected from a group consisting of frequency of appearance, title of an album, and time of the album.

5. The image processing apparatus according to claim 3, wherein the score is calculated based on the determination standard.

6. The image processing apparatus according to claim 1, further comprising:
a display control unit configured to present, for each event, the protagonist identified by the protagonist identification unit using circuitry.

7. The image processing apparatus according to claim 6, wherein the display control unit presents a standard to identify the protagonist identified by the protagonist identification unit.

8. The image processing apparatus according to claim 1, wherein the protagonist identification unit identifies the protagonist of the event by using text data provided to the event, as the parameter independent of the analysis of the image.

9. The image processing apparatus according to claim 8, wherein the protagonist identification unit identifies the protagonist of the event by using information to identify a person, included in the text data provided to the event.

10. The image processing apparatus according to claim 9, wherein, if the information to identify a person is included in the text data, the protagonist identification unit identifies the person as the protagonist of the event.

11. The image processing apparatus according to claim 8, where in the protagonist identification unit identifies the protagonist of the event by using a personal pronoun, included in the text data provided to the event.

12. The image processing apparatus according to claim 1, wherein the protagonist identification unit identify multiple key event participants.

13. The image processing apparatus according to claim 12, wherein the protagonist prioritizes the multiple key event participants based on their respective score.

14. The image processing apparatus according to claim 1, wherein the protagonist identification unit corrects the score when a protagonist has a picture taken alone.

15. The image processing apparatus according to claim 1, wherein the protagonist identification unit corrects the score when a picture has a focus on a face of the protagonist.

16. An information processing method comprising:
analyzing image data; and identifying a protagonist of an event including at least one set of image data, wherein the protagonist is the most important person of the event, wherein the protagonist identification step identifies the protagonist of the event by using at least a parameter independent of an analysis of an image provided to the event, wherein, if the protagonist of the event is not able to be identified by using the parameter independent of the analysis of the image, the information processing method has, in the image analysis step, the image data included in the event analyzed to identify the protagonist of the event, and wherein a score is provided to a participant of the event based on a result of the analysis of the image, and the protagonist of the event is identified, based on the score.

17. A non-transitory computer-readable medium having embodied thereon a program, which when executed by a processor of an apparatus causes the processor to perform a method, the method comprising:

analyzing image data; and identifying a protagonist of an event including at least one set of image data, wherein the protagonist is the most important person of the event, wherein the protagonist identification step identifies the protagonist of the event by using at least a parameter independent of an analysis of an image provided to the event, wherein, if the protagonist of the event is not able to be identified by using the parameter independent of the analysis of the image, the information processing method has, in the image analysis step, the image data included in the event analyzed to identify the protagonist of the event, and wherein a score is provided to a participant of the event based on a result of the analysis of the image, and the protagonist of the event is identified, based on the score.

18. An image display apparatus comprising:

a content display unit to display a protagonist of an event including at least one set of image data, the protagonist being identified by using at least a parameter independent of an analysis of an image provided to the event, wherein the protagonist is the most important person of the event, wherein, if the protagonist of the event is not able to be identified by using the parameter independent of the analysis of the image, the content display unit displays the protagonist of the event identified by analyzing the image data included in the event, and wherein a score is provided to a participant of the event based on a result of the analysis of the image, and the protagonist of the event is identified, based on the score.

* * * * *